United States Patent [19]

Zavatti et al.

[11] 4,013,603

[45] Mar. 22, 1977

[54] COATING COMPOSITIONS FOR PROTECTING METALS

[75] Inventors: Michele Zavatti; Vittorio Baravalle; Paolo Saracino, all of Milan, Italy

[73] Assignee: Labofina S.A., Brussels, Belgium

[22] Filed: Feb. 10, 1975

[21] Appl. No.: 548,406

[30] Foreign Application Priority Data

Feb. 20, 1974 Italy .................................. 48563/74

[52] U.S. Cl. ......................... 260/28.5 D; 260/42.54
[51] Int. Cl.² ......................................... C08L 91/00
[58] Field of Search ................ 260/28.5 D, 28.5 R, 260/42.54

[56] References Cited

UNITED STATES PATENTS 3,661,839  5/1972  Klopfer ...................... 260/41 AG

FOREIGN PATENTS OR APPLICATIONS 794,751  9/1968  Canada

*Primary Examiner*—Lewis T. Jacobs
*Assistant Examiner*—William E. Parker

[57] ABSTRACT

Composition for protective coating of metallic surfaces, particularly those used in the automotive industry, which comprises 5 to 20% by weight of a vinylic resin, from 10 to 30% by weight of a plasticizer for the said vinyl resin, from 5 to 15% by weight of bituminous substances, from 0.1 to 1.5% by weight of a thixotropic agent and from 20 to 65% by weight of a filler, and which is applied by spraying on the metallic surfaces.

9 Claims, No Drawings

COATING COMPOSITIONS FOR PROTECTING METALS

BACKGROUND OF THE INVENTION

The present invention relates to compositions for protective coatings, particularly, protective coatings for metallic surfaces. More particularly, the present invention relates to coating compositions having anti-corrosive and anti-abrasive properties and which are sound deadeners.

Coating compositions find a wide field of applications in the automotive industry, especially for coating surfaces underneath automobiles which are subjected to rough contact with materials such as gravel, sand and dust. Such compositions are also widely used in the appliance industry, especially for sound proofing and protecting against corrosion of internal surfaces of domestic appliances such as washing machines, refrigerators, etc.

Compositions for coating surfaces and having anti-corrosive, anti-abrasive and sound deadening properties are well known in the prior art. However, these compositions must fulfill diverse conditions such as resistance to widely varying temperatures, good adhesion to the metallic substrates, age stability and economic suitability. While the known compositions are reasonably satisfactory for many uses, many of such compositions are limited in usage since they do not meet all of the necessary criteria.

The compositions generally used comprise bitumen solutions and fillers, as described in British patent Nos. 1,101,799, or in Canadian patent 794,751. Such products have good anti-corrosive and sound deadening properties and are inexpensive, but they are unsatisfactory with regard to antiabrasion, cohesion and resistance to low temperatures. Other compositions, more particularly used as underbody coatings, are based on polyvinyl plastisols. Such products have good anti-corrosive and anti-abrasive characteristics, but are rather expensive, and have poor storage stability and further, cause considerable wear to the appliances to which they are applied.

An object of the present invention is to provide a new and improved composition for protective coatings, particularly suitable for metallic surfaces, having an optimum combination of the required coating properties while being economically satisfactory.

A further object of the present invention is to provide a new and improved coating composition which may be easily applied by conventional spraying systems.

SUMMARY OF THE INVENTION

The present invention is a coating composition for coating metallic surfaces which comprises about 5 to 20% by weight of a vinylic resin, about 10 to 30% by weight of a plasticizer for the said vinylic resin, about 5 to 15% by weight of a bituminous substance, about 0.1 to 1.5% by weight of a thixotropic agent and about 20 to 65% by weight of a filler. In a preferred embodiment, the composition of the invention also includes a minor amount, generally from 0.5 to 5% by weight based on the final composition, of an auxiliary resin in order to improve the final characteristics of the protective coatings and particularly the mechanical properties of the coating.

In another embodiment, the coating composition of the present invention may contain different additives which generally are used in the field of polymer mixtures, such as solvents, dispersing agents, stabilizers, anti-rust agents, polymerization catalysts, etc.

DESCRIPTION OF THE PREFERRED EMBODIMENTS

The composition of the present invention generally is in the form of a non-fluid product having a pasty consistence and comprising a polyvinylic plastisol intimately mixed with a hydrocarbon fraction having a high boiling point, together with additives and suitable fillers in defined ratios. The vinylic resin used in the composition of the present invention preferably comprises a vinyl chloride homopolymer or a copolymer of vinyl chloride with a copolymerizable monomer. Vinyl chloride homopolymers preferably are prepared by emulsion polymerization. When copolymers are used, the primary monomer of the copolymer is vinyl chloride and the commonomer is a compound selected from the group consisting of vinyl acetate, vinyl propionate, methyl acrylate, methyl methacrylate, maleic acid esters (such as butyl maleate), butyl acrylate, butyl methacrylate, acrylonitrile, vinylidene chloride, and the like.

The plasticizer used in the composition of the invention may be any specific plasticizer of the polyvinyl chloride, the most known being the esters of aliphatic and aromatic di- and tri-carboxylic acids and the organic phosphates. Such plasticizers may be phthalic acid esters, such as for example bis(2-ethylhexyl)phthalate, dibutylphthalate, diisobutylphthalate, diisononylphthalate, the phthalates of normal alcohols $C_7$, $C_9$ and $C_{11}$, diisodecylphthalate, diisoundecylphthalate and the like, and the phosporic acid esters, such as for example, tricresylphosphate, bis(2-ethylhexyl)phenylphosphate, tris(2-ethylhexyl)phosphate, diphenylcresylphosphate and the like, the esters of adipic acid, succinic acid, sebacic acid, azelaic acid and the like.

The bituminous substances used in the composition of the present invention include not only the natural bitumens as for example those of Trinidad and of Selenizza, the gilsonite, the asphaltic powders resulting from the mechanical treatment of bituminous rocks from Abbruzes and Sicily and the like, but also the bitumens directly obtained as distillation residues of crude oil, the oxidized bitumens, the residues of cracking units, coal tars, the distillation residues of coal tars, animal and vegetable tars obtained by any process, and mixtures of such products.

The composition of the invention advantageously contains a thixotropic agent in order that prior to being applied, the composition of the present invention is in the form of a stable pasty and homogeneous product having a viscosity such that it may easily be applied by pulverization and particularly according to an airless spray system, and also, after being applied by pulverization, the composition of the invention is in the form of a coating having a high viscosity, which firmly adheres to the substrate and which does not run. Among the thixotropic agents which are useful in the present compositions are colloidal silica and particularly silica gels which are readily available or which are easily prepared by acidifying solutions of soluble silicates with formation of a hydrosol or of a gelatineous precipitate, the reaction products of bentonite with an amine, such as for example the products obtained by reacting a heterocyclic tertiary amine with a derivative of attapulgite, salts of monocarboxylic acids and of alkali or alkaline-earth metals, such as sodium, potassium, lithium, calcium, barium and strontium salts of fatty acids, for instance caprylic acid, lauric acid, myristic acid, palmitic acid, stearic acid, oleic acid, ricinolic acid, linolenic acid, linoleic acid and the like.

The composition of the present invention also may contain minor amounts of certain auxiliary resins in order to improve certain specific characteristics of the end coating. These resins are selected from the group consisting of thermoplastic polyamide resins obtained by condensing diamines with dicarboxylic acids, the epoxy resins obtained by condensing bisphenol-A with epichlorhydrin, thermosetting phenolic resins from the group of novolac and particularly phenol-formaldehyde resins which already contain cross-linking agent as for example, hexamethylenetetramine, necessary for hardening at high temperature. These auxiliary resins are used in an amount of from 0.5 to 2% by weight for polyamide resins, from 0.5 to 4%, by weight for epoxy resins and from 1.0 to 5% by weight for phenolic resins, these weight percentages being based on the total composition weight.

The compositions of the present invention contain a filler which is used not only as a diluent but also for improving certain properties of the protective coating and especially its internal cohesion. The filler is used in an amount of about 20 to 65% by weight based of the total composition weight. The fillers which are used in the compositions of the present invention may be calcium carbonate, baryta, talc, mica, clay, kaolin, silicates, asbestos fibers, and the like. In a preferred embodiment of the present invention, calcium carbonate is used, this carbonate being an abrasiveless filler of the "soft" type. This filler also may be used as a plasticizer permitting reduction of the content of true plasticizer in the composition and thus a reduction in the expense of the composition.

The composition of the invention also may contain from 0 to 15% by weight, based on the weight of the total composition, of a solvent selected from the group consisting of gasoline, mineral resin, kerosene, aliphatic, cycloparaffinic and aromatic hydrocarbons, the solvents extracted from tar such as naphtha or the aromatic solvents such as toluene or xylene, the chlorinated solvents such as dichloropropane and trichloroethylene, the ketones such as acetone, methylethylketone and methylisobutylketone, or mixtures of these.

The present compositions are in the form of a soft, homogeneous paste, of a dark chestnut color having an excellent aging resistance and storing stability and which does not require stirring before use. Such compositions may be applied by pulverization on metallic surfaces which have been previously treated with a conventional primer of the type used in the automobile industry and particularly those conventionally used for the underbody areas. The film of protective coating formed after the pulverization adheres to the metallic surface owing to the presence of the thixotropic agent in the composition. This adhesion to the support is further improved if hardening of the film is carried out by drying in a furnace at a temperature of between 100° and 200° C for about 30 minutes. The protective film obtained according to these conditions has an excellent adhesion even if the film is in the form of thin layers of 0.2–0.3 mm thickness. Moreover, the film also has good abrasion resistance, measured according to the FIAT No. 50488 method. Additionally, the protective coatings obtained with the compositions of the present invention have good anti-corrosive properties when they are submitted to the salt spray test (ASTM B-117), to the humidity test (High-Humidity-Cabinet ASTM D-1748) and to corrosive atmospheres containing $SO_2$ (kesternich test, DIN 50018).

The protective coatings obtained from the compositions of the present invention have been submitted to further tests to determine their sound deadening properties. The tests were in accordance with the method FIAT "Normalization 955645, paragraphs 1.6.1 – 1.6.2 – 1.6.3." for the determination of sound deadening properties. This action shows a decreasing speed of vibrations higher than 5 decibels/sec.

The present compositions may be applied either by air assisted spray systems according to which the atomization of the product is carried out with air, or by the more recent airless spray system according to which the atomization of the product is carried out by passing the product, under high pressure, through nozzles having extremely fine orifices of elliptical or similar cross-section. Exemplary operating conditions relating to both of these spray techniques are described in Tables I and II below.

TABLE I

| Operating conditions for airless spray | |
|---|---|
| Compression ratio to the pump | 45/1 |
| Air pressure in the pump (kg/cm$^2$) | 1.5 – 2.0 |
| Diameter of the spray gun (mm) | 0.89 |
| angle of spray gun nozzle (°) | 60 |

TABLE II

| Operating conditions for air-assisted spray | |
|---|---|
| Compression ratio to the pump | 9/1 |
| Air pressure in the pump (kg/cm$^2$) | 2.5 – 3.0 |
| Air pressure in the spray-gun (kg/cm$^2$) | 5.0 |
| Diameter of the spray-gun nozzle (mm) | 6.35 |

These tables show that the airless spray is particularly advantageous with regard to economic conditions. As a result of the fluidity of the present compositions, they may be applied under relatively low pressure, which considerably reduces the wear on the application apparatus.

The following examples are presented in order to illustrate the present invention but are not to be considered as limiting to such invention.

EXAMPLE 1

The following composition was prepared in a vessel with a stirrer and a heating and/or cooling system.

| Constituent | % by weight |
|---|---|
| oxidized bitumen | 6.5 |
| diisobutylphthalate | 14.0 |
| polyvinyl chloride | 10.0 |
| mineral resin | 9.0 |
| baryta | 38.7 |
| calcium carbonate | 20.0 |
| silica gel | 0.5 |
| asbestos fiber | 1.3 |

This composition had the following characteristics:

| | |
|---|---|
| Aspect | pasty, homogeneous |
| Density at 20° C | 1.7 |
| Brookfield viscosity at 25° C (7.20 rpm) | 40,000 cps |
| Airless spray (nozzle Graco 635) | good |

This composition was applied on metallic substrate which was already coated by a primer. The film obtained was submitted to curing in an oven at a temperature of 130° C for 30 minutes. After curing, the film had the following characteristics:

| | |
|---|---|
| Adhesion (0.3 mm thickness) | pass (no sealing) |
| abrasion | 7 kg/mm |
| Hardness Shore A | 83 |

EXAMPLE 2

The following composition for protective coating was prepared in the vessel as described in Example 1.

| Constituent | % by weight |
|---|---|
| polyvinyl chloride | 5.0 |
| diisobutylphthalate | 15.0 |
| epoxy resin | 0.5 |
| phenol-formaldehyde resin | 3.0 |
| bitumen (distillation residue of crude oil) | 5.0 |
| silica gel | 1.0 |
| filler (asbestos fiber, baryta, calcium carbonate) | 55.5 |
| mineral resin | 15.0 |

The constituents were mixed to form a soft, homogeneous paste of a dark chestnut color and having the following properties:

| | |
|---|---|
| Density at 15° C | 1.76 |
| Brookfield viscosity at 25° C | |
| 7 – 5 rpm | 100,000 cps |
| 7 – 20 rpm | 42,000 cps |

This composition was applied by the airless spray system pulverization process on a metallic substrate. The film obtained was thereafter submitted to the corrosion tests and with results as indicated below:

| | |
|---|---|
| Resistance to salt spray (Salt Spray Test ASTM B-117) | more than 500 hours |
| Resistance to humidity (High Humidity Cabinet ASTM D-1748) | more than 500 hours |
| Resistance in corrosive atmosphere (Kesternich Test DIN 50018) | more than 170 hours |

EXAMPLE 3

The following composition was prepared in the vessel as described in Example 1.

| Constituent | % by weight |
|---|---|
| polyvinyl chloride | 18.5 |
| dibutylphthalate | 30.0 |
| polyamide resin | 1.0 |
| bitumen (distillation residue of oil) | 15.0 |
| silica gel | 0.5 |
| calcium carbonate | 34.0 |
| mineral resin | 1.0 |

The film obtained by airless spray of this composition was submitted to the following tests:

| | |
|---|---|
| - vertical flow (film thickness: 1 mm) | |
| at ordinary temperature | nul |
| at 13° C | nul |
| -continued | |
|---|---|
| - bending on mandrel of 20 mm | no bare metal |
| - adhesion on varnished sheet (film thickness: 0.3 mm) | good |
| - abrasion | 18.0 kg/mm |
| - solids content (2 hours at 140° C) | 99.0% |

From the above examples, it is believed apparent that compositions having a good aging and storing resistance and having good technical properties with regard to abrasion, adherence to the support, corrosion and which can be used with airless spray systems have been produced from bituminous materials. Moreover, these compositions are economically advantageous not only because the price of the components used is low but also because wear of the spray devices is reduced.

What is claimed is:
1. In a sprayable composition used as a protective coating for metallic surfaces comprising a bituminous substance, a thixotropic agent and a filler, the improvement which comprises a composition having from about 5 to 20% by weight of a vinylic resin selected from the group consisting of homopolymer and copolymer of vinyl chloride, from about 10 to 30% by weight of a plasticizer for said vinylic resin, from 5 to 15% by weight of a bituminous substance, from 0.1 to 1.5% by weight of a thixotropic agent and from 20 to 65% by weight of a filler.
2. The composition of claim 1 wherein from 0.5 to 5% by weight, based on the total weight of the composition, of an auxiliary resin selected from the group consisting of the polyamide resins, the epoxy resins and the phenol-formaldehyde resins is included in said composition.
3. The composition of claim 1 wherein said vinylic resin is a homopolymer of vinyl chloride or a copolymer of vinyl chloride with a copolymerizable comonomer, said vinyl chloride being the major constituent of said copolymer.
4. The composition of claim 1 wherein said plasticizer of said vinylic resin is selected from the group consisting of the esters of di and tricarboxylic aliphatic or aromatic acids and the organic phosphates.
5. The composition of claim 1 wherein said bituminous substance is selected from the group consisting of the natural bitumens, the residual bitumens of crude oil distillation, the oxidized bitumens, the tars, the vegetable or animal pitches and mixtures thereof.
6. The composition of claim 1 wherein said thixotropic agent is selected from the group consisting of colloidal silica, the reaction products of bentonites with amines, and the alkali or alkaline-earth metal salts of monocarboxylic acids.
7. The composition according to claim 1 wherein said filler is selected from the group consisting of calcium carbonate, baryta, talc, clays, kaolin, silicates and asbestos fibers.
8. The composition of claim 1 wherein a solvent selected from the consisting of petroleum fractions, aliphatic, cycloparrafinic and aromatic hydrocarbons, chlorinated hydrocarbons, ketones and mixtures thereof is included in said composition.
9. The composition of claim 8 wherein said vinylic resin comprises 10% by weight of polyvinyl chloride, said plasticizer comprises 14% by weight of diisobutylphthalate, said bituminous substance comprising 6.5% by weight of oxidized bitumen, said thixotropic agent comprises 0.5% by weight of silica gel, said solvent comprises 9.0% by weight of a mineral resin, and said filler comprises 60% by weight of a mixture of baryta, calcium carbonate and asbestos fiber.

* * * * *